United States Patent
Kwon et al.

(10) Patent No.: US 8,872,901 B2
(45) Date of Patent: Oct. 28, 2014

(54) STEREOSCOPIC GLASSES AND DISPLAY APPARATUS INCLUDING THE SAME

(75) Inventors: Oh-yun Kwon, Seoul (KR); Geo-geun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 744 days.

(21) Appl. No.: 13/037,414

(22) Filed: Mar. 1, 2011

(65) Prior Publication Data

US 2012/0007959 A1 Jan. 12, 2012

(30) Foreign Application Priority Data

Jul. 8, 2010 (KR) ........................ 10-2010-0066024

(51) Int. Cl.
*H04N 13/04* (2006.01)
*H04N 13/00* (2006.01)

(52) U.S. Cl.
CPC ........ *H04N 13/0022* (2013.01); *H04N 13/0434* (2013.01); *H04N 13/0484* (2013.01); *H04N 13/0033* (2013.01); *H04N 13/0429* (2013.01); *H04N 13/0438* (2013.01)
USPC .......................................................... 348/51

(58) Field of Classification Search
USPC .......................................................... 348/51
See application file for complete search history.

(56) References Cited

U.S. PATENT DOCUMENTS

| | | | | |
|---|---|---|---|---|
| 5,265,199 A | * | 11/1993 | Catlin | 345/422 |
| 5,726,704 A | | 3/1998 | Uomori | |
| 5,857,120 A | * | 1/1999 | Konishi | 396/51 |
| 5,990,898 A | * | 11/1999 | Urano | 345/426 |
| 6,111,597 A | | 8/2000 | Tabata | |
| 6,429,867 B1 | * | 8/2002 | Deering | 345/423 |
| 2006/0007301 A1 | * | 1/2006 | Cho et al. | 348/51 |
| 2006/0197832 A1 | * | 9/2006 | Yamada et al. | 348/77 |
| 2007/0007301 A1 | * | 1/2007 | Kaplan et al. | 221/288 |
| 2008/0303894 A1 | | 12/2008 | Ernst et al. | |

FOREIGN PATENT DOCUMENTS

KR 10-2008-0077391 A 8/2008

OTHER PUBLICATIONS

Search Report issued May 4, 2012 by the European Patent Office in counterpart European Application No. 11156297.1.

* cited by examiner

*Primary Examiner* — Sath V Perungavoor
*Assistant Examiner* — Jeffrey Williams
(74) *Attorney, Agent, or Firm* — Sughrue Mion, PLLC

(57) ABSTRACT

Stereoscopic glasses and a display apparatus including the same, which can reduce a user's eyestrain, are provided. The display apparatus includes: a signal processor which processes a three-dimensional (3D) video signal to have a predetermined depth effect; a display unit which displays a 3D image based on the video signal processed by the signal processor; and a controller which controls the signal processor to process a first area determined viewed by a user and a second area that is not determined to be viewed by the user, of the 3D image displayed by the display unit, such that the first area is different in level of a depth effect than the second area. Accordingly, a user's eyestrain is remarkably reduced to thereby increase convenience.

21 Claims, 6 Drawing Sheets

US 8,872,901 B2

STEREOSCOPIC GLASSES AND DISPLAY APPARATUS INCLUDING THE SAME

CROSS-REFERENCE TO RELATED APPLICATION

This application claims priority from Korean Patent Application No. 10-2010-0066024, filed on Jul. 8, 2010 in the Korean Intellectual Property Office, the disclosure of which is incorporated herein by reference in its entirety.

BACKGROUND

1. Field

Apparatuses and methods consistent with exemplary embodiments relate to stereoscopic glasses and a display apparatus including the same, and more particularly to stereoscopic glasses and a display apparatus including the same in which a depth effect of a three-dimensional (3D) image is adjustable to reduce eyestrain of a user.

2. Description of the Related Art

In general, a display apparatus that can display a 3D image represents depth information with regard to a wide scope provided by a depth map on a 3D display screen. In the case of an image including a plurality of objects, the depth information is represented with regard to all of the plurality of objects such that a user's eyes are distributed to all of the plurality of objects. Accordingly, the user may experience vertigo when 3D images of both eyes are combined in a brain, may feel eyestrain, etc., thereby increasing inconvenience.

SUMMARY

Accordingly, one or more exemplary embodiments provide stereoscopic glasses and a display apparatus including the same, in which a depth effect of a three-dimensional (3D) image is adjustable to reduce eyestrain of a user.

According to an aspect of an exemplary embodiment, there is provided a display apparatus including: a signal processor which processes a 3D video signal to have a predetermined depth effect; a display unit which displays the 3D image based on the processed video signal by the signal processor; and a controller which controls the signal processor to process a first area viewed by a user and a second area other than the first area to be different in a level of a depth effect within the 3D image displayed by the display unit.

The controller may control the signal processor to process the first area to have a depth effect having a predetermined level higher than that of the second area.

The controller may control the signal processor to process the second area to have a depth effect having a predetermined level lower than that of the first area.

The display apparatus may further include a sensor which senses the first area viewed by the user within the 3D image displayed by the display unit.

The sensor may sense a position viewed by the user within the 3D image displayed by the display unit by tracing at least one of a position and a motion of an eyeball of the user, and may generate information about the sensed viewing position.

The sensor may determine the user's viewing direction with respect to a preset point on the display unit by sensing a position of the user's eyeball, and may generate information about a viewing position by determining the position viewed by the user within the 3D image displayed by the display unit on the basis of the determined viewing direction.

The display apparatus may further include a coordinate calculator which calculates coordinates corresponding to the viewing position on the display unit on the basis of information about the viewing position.

The display apparatus may further include a viewing area scope determiner which determines a scope of the user's viewing area within the 3D image displayed by the display unit on the basis of the calculated coordinates.

The viewing area scope determiner may determine a predetermined scope, where the user's viewing frequency is highest among viewing positions sensed for a predetermined period of time, as the scope of the user's viewing area.

The viewing area scope determiner may determine an object, where the user's viewing frequency is highest in at least one object included in the image, as the scope of the user's viewing area.

The 3D image displayed on the display unit may include a plurality of divisional areas, and the viewing area scope determiner may determine at least one area, where a viewing frequency is highest among the plurality of areas, as the scope of the user's viewing area.

The display apparatus may further include a receiver which receives a video signal, wherein the signal processor includes a depth information extractor which extracts depth information from the 3D video signal when receiving the 3D video signal including the depth information through the receiver, and the controller controls the signal processor to process the second area to have a depth effect having a level lower than that of the extracted depth information.

The display apparatus may further include a receiver which receives a video signal; and a storage unit which stores depth information for reconstructing a two-dimensional (2D) video signal received though the receiver into the 3D video signal, wherein the signal processor processes the received 2D video signal to be reconstructed as the 3D video signal on the basis of the depth information stored in the storage unit, and the controller controls the signal processor to process the second area to have a depth effect having a level lower than that of the stored depth information.

The display apparatus may further include stereoscopic glasses including: a frame; a lens unit which is supported by the frame and transmits light corresponding to the 3D image displayed by the display unit to give a predetermined depth effect; and a sensor which senses the user's viewing area within the 3D image displayed by the display unit.

The sensor of the stereoscopic glasses may sense a position viewed by the user within the 3D image displayed by the display unit by tracing at least one of a position and a motion of the user's eyeball, may generate information about the sensed viewing position, and may transmit the information to the display apparatus.

The sensor of the stereoscopic glasses may determine the user's viewing direction with respect to a preset point on the display unit by sensing a position of the user's eyeball, may generate information about a viewing position by determining the position viewed by the user within the 3D image displayed by the display unit on the basis of the determined viewing direction, and may transmit the information to the display apparatus.

According to an aspect of another exemplary embodiment, there is provided stereoscopic glasses for viewing a 3D image displayed by a display apparatus, the stereoscopic glasses including: a frame; a lens unit which is supported by the frame and transmits light corresponding to the 3D image displayed by the display apparatus to give a predetermined depth effect; and a sensor which senses a user's viewing area within the 3D image displayed by the display apparatus.

The sensor may sense a position viewed by the user within the 3D image displayed by the display apparatus by tracing at least one of a position and a motion of the user's eyeball, may generate information about the sensed viewing position, and may transmit the information to the display apparatus.

The sensor may determine the user's viewing direction with respect to a preset point on the display apparatus by sensing a position of the user's eyeball, may generate information about a viewing position by determining the position viewed by the user within the 3D image displayed by the display apparatus on the basis of the determined viewing direction, and may transmit the information to the display apparatus.

According to an aspect of another exemplary embodiment, there is provided a method of processing a three-dimensional (3D) video signal, the method including: displaying, by a display unit, a 3D image based on the 3D video signal; and processing a first area determined to be viewed by a user and a second area that is not determined to be viewed by the user, of the 3D image displayed by the display unit, such that the first area is different in level of a depth effect than the second area.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
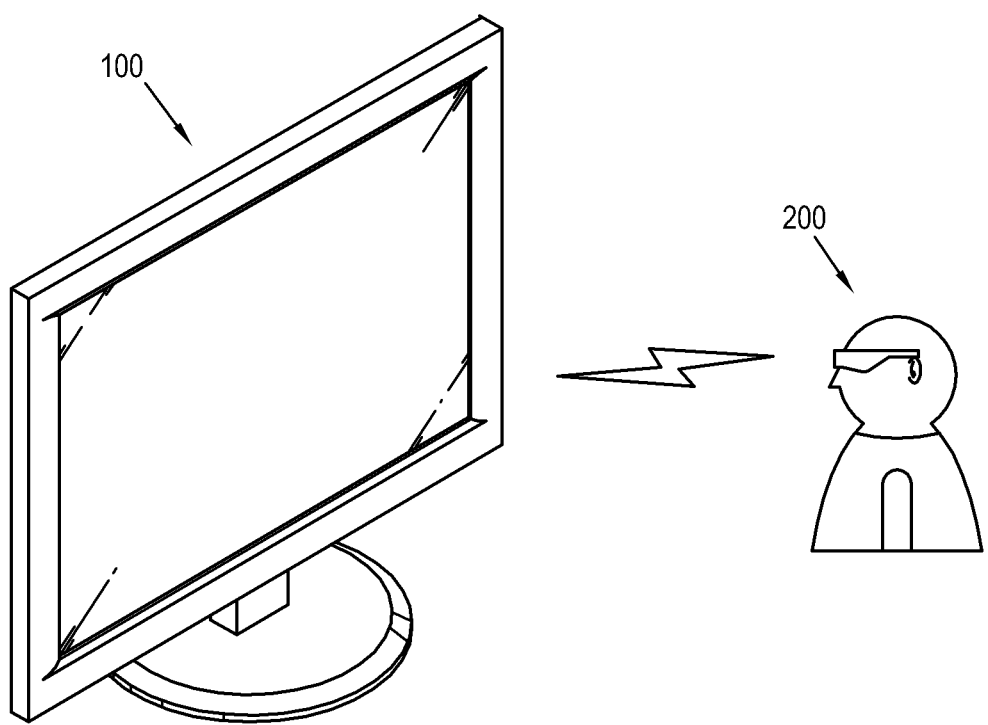
FIG. 1 is a schematic view of a display system according to an exemplary embodiment.

Exemplary embodiments will now be described with reference to the accompanying drawings. Exemplary embodiments may be embodied in various forms without being limited to the exemplary embodiments set forth herein. Descriptions of well-known parts are omitted for clarity, and like reference numerals refer to like elements throughout. It is understood that expressions such as "at least one of," when preceding a list of elements, modify the entire list of elements and do not modify the individual elements of the list.

FIG. 1 is a schematic view of a display system according to an exemplary embodiment. Referring to FIG. 1, the display system includes a display apparatus 100 capable of processing a video signal input from an exterior and displaying an image, and stereoscopic glasses 200 allowing a predetermined cubic effect or depth effect to be recognized corresponding to a three-dimensional (3D) video signal if an image displayed on the display apparatus 100 is a 3D image.

The display apparatus 100 according to the present exemplary embodiment can process an area viewed by a user within the 3D image displayed on the display unit to have a depth effect different in level from areas other than the viewed area, so that a user's eyestrain can be remarkably reduced when the user views a 3D image, thereby increasing convenience. At this time, a sensor for sensing a viewing area of a user may be included in at least one of the display apparatus 100 or stereoscopic glasses 200.

The display apparatus 100 and the stereoscopic glasses 200 may employ polarization glasses or shutter glasses to achieve a stereoscopic effect.

For example, in the case of polarization glasses to provide a 3D image, the display apparatus 100 may include a polarized filter and the polarization glasses are polarized in the same way as the polarized filter so that only an left image can be viewed by a left eye and only a right image can be viewed by a right eye, thereby achieving the stereoscopic effect.

Furthermore, by way of example, in the case of shutter glasses using a shutter to provide a 3D image, the display apparatus alternately displays left and right images so that a left glass can be open to a left image and a right glass can be open to a right image, thereby separating the left and right images and achieving the stereoscopic effect.

The display apparatus 100 may receive a video signal from an external video source (not shown), though it is understood that another exemplary embodiment is not limited in video source thereto. For example, the display apparatus 100 may receive a video signal from various video sources such as a computer (not shown) that generates and locally provides a video signal through a central processing unit (not shown) and a graphic card (not shown), a server (not shown) that can provide a video signal through a network, a transmitter of a broadcasting station that can transmit a broadcasting signal through airwaves or a cable, etc.

The display apparatus 100 receives a two-dimensional (2D) video signal or a 3D video signal from an exterior, and processes the received signal to be displayed as a 2D image or a 3D image. When the display apparatus 100 receives a 2D video signal, the 2D video signal may be reconstructed as a 3D video signal on the basis of predetermined depth information, thereby displaying a 3D image.

In the case of the polarization glasses, the display apparatus 100 separates the 3D image into left and right images and displays the images in a vertical line. Thus, if the 3D image is seen through the polarization glasses polarized in the same way as the polarized filter, only the left image is input to the left eye and only the right image is input to the right eye, thereby providing a stereoscopic effect.

In the case of the shutter glasses, the 3D image is divided into a left eye image corresponding to a user's left eye and a right eye image corresponding to a user's right eye. When the display apparatus 100 receives the 3D video signal, the left eye image and the right eye image are alternately displayed per frame on the basis of the 3D video signal. At this time, the display apparatus 100 transmits a sync signal to the shutter glasses in order to alternately open and close a left shutter unit and a right shutter unit of the shutter glasses in accordance with the frames for displaying the left eye image or the right eye image. While the display apparatus 100 is displaying the 3D image, the shutter glasses selectively open or close a view of a user's left eye or right eye in accordance with which one of the left eye image or the right eye image is currently displayed. That is, when the display apparatus 100 displays the left eye image, the shutter glasses open the view of the left eye but close the view of the right eye. On the other hand, when the display apparatus 100 displays the right eye image, the shutter glasses open the view of the right eye but close the view of the left eye.

Figure 2:
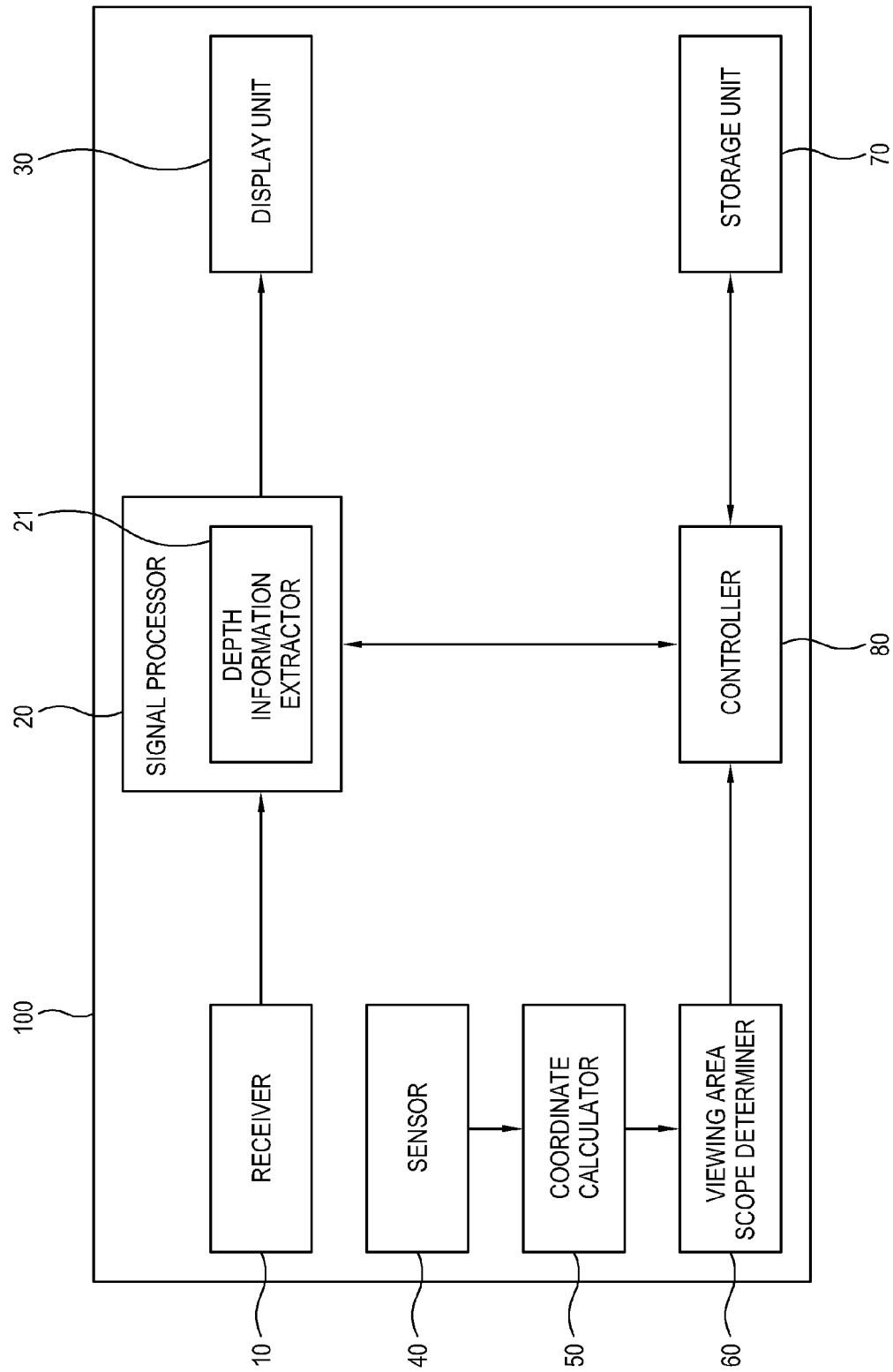
FIG. 2 is a control block diagram of a display apparatus 100 according to an exemplary embodiment.

FIG. 2 is a control block diagram of a display apparatus 100 according to an exemplary embodiment.

Referring to FIG. 2, the display apparatus 100 includes a receiver 10, a signal processor 20, a display unit 30, a sensor 40, a coordinate calculator 50, a viewing area scope determiner 60, a storage unit 70, and a controller 80.

The receiver 10 receives a video signal from an exterior and transmits the received video signal to the signal processor 20, which can be achieved in various manners corresponding to a format of the received video signal and a type of the display apparatus 100. The video signal may include at least one of a 2D video signal a 3D video signal, an audio signal, and a data signal.

For example, if the display apparatus 100 is a television (TV), the receiver 10 may wirelessly receive a radio frequency (RF) signal transmitted from a broadcast receiving apparatus, or may receive a video signal based on composite video, component video, super video, Syndicat des Constructeurs des Appareils Radiorecepteures et Televiseurs (SCART), high definition multimedia interface (HDMI), etc. Moreover, the receiver 110 may further include an antenna (not shown) and/or a tuner (not shown) for selecting a broadcasting channel.

For example, if the display apparatus 100 is a monitor for a personal computer, the receiver 10 may be realized by: D-SUB capable of transmitting RGB signals based on video graphics array (VGA); a digital video interactive-analog (DVI-A), a DVI-integrated digital/analog (DVI-I) and a DVI-digital (DVI-D) based on DVI; HDMI; etc. Furthermore, the receiver 10 may be realized by a DisplayPort, a unified display interface (UDI), a wireless HD, etc.

The signal processor 20 processes a predetermined 3D video signal to have a predetermined depth effect and transmits the processed 3D video signal to the display unit.

Moreover, when a 2D video signal is received through the receiver 10, the signal processor 20 can reconstruct the 2D video signal into a 3D video signal on the basis of predetermined depth information (e.g., stored in the storage unit 70), and can transmit the 3D video signal to the display unit 30.

The signal processor 20 may further include a depth information extractor 21 to extract depth information when receiving a 3D video signal including the depth information through the receiver 10. Thus, the 3D video signal is processed to have the depth effect based on the depth information extracted by the depth information extractor 21, and is then transmitted to the display unit 30.

Furthermore, the signal processor 20 may perform various image processes with respect to the video signal. For example, the image processes may include at least one of decoding and encoding, de-interlacing, frame refresh rate conversion, scaling, noise reduction, detail enhancement, line scanning, etc.

The signal processor 20 processes the video signal into a plurality of horizontal scan lines per frame and scans the processed video signal to the display unit 30. For example, the signal processor 20 scans an image from a top to a bottom of a display area of the display unit 30. When one frame is completely scanned, an image of the next frame is scanned leaving a preset non-scan period between the frames.

According to an exemplary embodiment, if the display apparatus 100 uses the polarization glasses to display a stereoscopic image, the signal processor 20 alternately and horizontally scans the video signals, respectively corresponding to the left eye image and the right eye image in the plurality of horizontal scan lines, to the display unit 30 when receiving the video signal corresponding to the stereoscopic image from the receiver 10.

According to another exemplary embodiment, if the display apparatus 100 uses the shutter glasses to display a stereoscopic image, the signal processor 20 sequentially and alternately scans the video signals, respectively corresponding to the left eye image and the right eye image within the video signal corresponding to the stereoscopic image transmitted through the receiver 10, to the display unit 30. Thus, the left eye image and the right eye image are alternately displayed on the display unit 30 during the non-scan period. In this case, the display apparatus 100 may further include a communication unit (not shown) to communicate with the shutter glasses and a signal generator (not shown) to generate sync signals for the left eye image and the right eye image. Under control of the controller 80 (to be described later), the sync signal generated by the signal generator (not shown) is transmitted to the shutter glasses through the communication unit (not shown), and the shutter glasses alternately opens and closes lens units thereof.

The signal processor 20 may process an audio signal received through the receiver 10. Various audio processes with regard to the audio signal may be performed. For example, the audio processes may include at least one of digital conversion of an analog voice signal, amplification of an audio signal, output level control of an audio signal, frequency compensation of an audio signal, etc.

The display unit 30 displays an image corresponding to a 3D video signal processed by the signal processor 20. For example, in the display unit 30, the plurality of horizontal scan lines are scanned from the signal processor 20 and vertically arranged to thereby display one image frame. The display unit 30 includes a display panel (not shown) for displaying the image. The display panel (not shown) may include a liquid crystal display (LCD) panel having a liquid crystal layer, an organic light emitting display (OLED) panel having an organic light emitting layer, a plasma display panel (PDP), etc.

The sensor 40 traces a position and/or motion of an eyeball, and senses a position viewed by a user within a 3D image displayed on the display unit 30, thereby generating information about the sensed viewing position.

Specifically, the sensor 40 may include at least one of an eye tracing sensor and an eye tracing camera for tracing at least one of a position and a motion of a pupil of the eyeball. Thus, the sensor 40 senses the position of a user's pupil and determines the user's viewing direction with respect to a preset point on the display unit 30. That is, an angle between the preset point on the display unit 30 and the sensed position of the pupil is determined, and thus a user's viewing direction on an image displayed in the display unit 30 is determined on the basis of the determined angle. According to the determined viewing direction, the position viewed by a user within the 3D image displayed by the display unit 30 is determined, thereby generating information about the viewing position.

The sensor 40 may trace at least one of the position and the motion of the user's pupil at every vertical sync period of a video signal.

The coordinate calculator 50 can calculate coordinates corresponding to the viewing position on the display unit on the basis of the information about the viewing position generated by the sensor 40. Corresponding to the viewing position, it is possible to calculate the coordinates of an image pixel displayed on the display unit 30.

The viewing area scope determiner 60 can determine a scope of the user's viewing area within the 3D image displayed by the display unit 30 based on the coordinates calculated by the coordinate calculator 50.

The viewing area scope determiner 60 may determine, as the user's viewing area scope, a predetermined scope of at least one position where a user's viewing frequency is highest among the viewing positions sensed for a predetermined time.

On the basis of information about the user's viewing positions generated in the sensor 40 for a preset period of time, the coordinate calculator 50 calculates a plurality of coordinates. Further, a scope where coordinates having values approximating to a predetermined range are most distributed may be determined among the plurality of coordinates. Thus, a predetermined scope within an image on the display unit 30, corresponding to a scope where the plurality of coordinates having values approximating to the predetermined range are most distributed, may be determined as the user's viewing area scope.

Furthermore, the viewing area scope determiner 60 may determine a certain object, to which the scope where the coordinates having values approximating to the predetermine range are most distributed belongs, as the user's viewing area scope. That is, in the case that at least one object is included in an image, an object corresponding to the scope where the coordinates having the values approximating to a predetermined range are most distributed for a preset time is selected among the objects, and the selected object is determined as the user's viewing area scope.

For example, if an image includes an object having a human shape and the scope where the coordinates having values approximating to a predetermined range are most distributed for a preset period of time is a head of the human shape, the whole object having the human shape may be determined as the user's viewing area scope.

Moreover, if an image displayed in the display unit 30 includes a plurality of divisional areas, the viewing area scope determiner 60 may determine at least one area among the plurality of areas, which corresponds to a scope where the coordinates having the values approximating to the predetermined range are most distributed, as the user's viewing area scope.

For example, in the case where an image displayed on the display unit includes N×M areas (where N and M are integers), at least one area corresponding to the scope where the coordinates having the values approximating to the predetermined range may be determined as the user's viewing area scope among the plurality of areas.

The storage unit 70 may store depth information used to reconstruct a 2D video signal into a 3D video signal when receiving the 2D video signal through the receiver 10.

The controller 80 may control the signal processor 20 to process an area, being viewed by the user among 3D images displayed by the display unit 30, to have a depth effect different in level from those of other areas not being viewed by the user.

If the user's viewing area scope is determined within the 3D image displayed by the display unit 30 by the sensor 40, the coordinate calculator 50 and the viewing area scope determiner 60, the controller 80 may control the signal processor 20 to process the determined viewing area scope to have a depth effect different in level from those of areas other than the determined viewing area scope.

According to an exemplary embodiment, the controller 80 may control the signal processor 20 to process the determined viewing area scope to have a depth effect having a level higher than those of other areas except the determined viewing area scope.

Alternatively or additionally, the controller 80 may control the signal processor 20 to process areas except the determined viewing area scope to have a depth effect having a level lower than that of the determined viewing area scope.

If a 3D video signal having depth information is received through the receiver 10, the depth information extractor 21 extracts the depth information from the 3D video signal. The controller 80 may control the signal processor 20 so that a viewing area scope determined as being viewed by the user can be processed to have a depth effect corresponding to the extracted depth information but the other areas except the viewing area scope can be processed to have a depth effect having a predetermined level lower than that corresponding to the depth information.

Also, a 2D video signal may be received through the receiver 10 and reconstructed by the signal processor 20 into a 3D video signal on the basis of depth information (e.g., stored in the storage unit 70), so that an image corresponding to the 3D video signal can be displayed on the display unit 30. In this case, the controller 80 may control the signal processor 20 so that a viewing area scope determined as being viewed by the user can be processed to have a depth effect corresponding to the depth information but the areas other then the viewing area scope can be processed to have a depth effect having a predetermined level lower than that corresponding to the depth information.

According to an exemplary embodiment, if the sensor 40 is provided in the display apparatus 100, the stereoscopic glasses 200 (refer to FIG. 3) provided along with the display apparatus 100 may not include the sensor.

According to another exemplary embodiment, the stereoscopic glasses 200 (refer to FIG. 3) may include the sensor. In this case, the sensor 40 may or may not be provided in the display apparatus 100.

Figure 3:
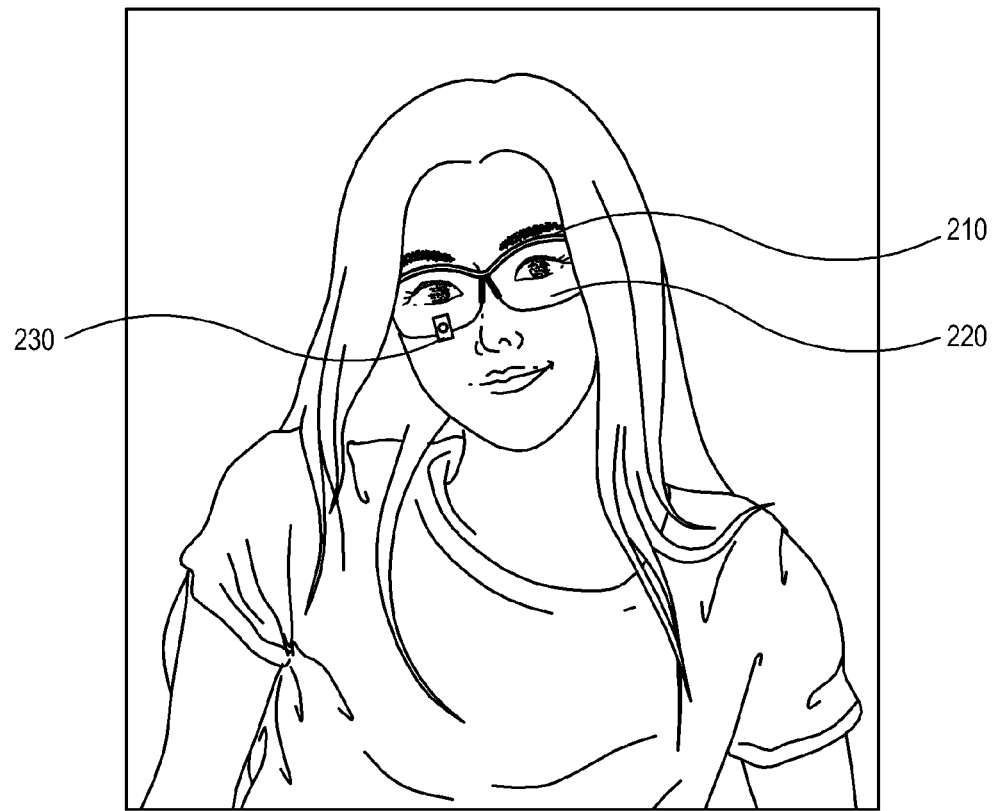
FIG. 3 is a perspective view of stereoscopic glasses 200 according to an exemplary embodiment.

FIG. 3 is a perspective view of stereoscopic glasses 200 according to an exemplary embodiment.

Referring to FIG. 3, the stereoscopic glasses 200 include a frame 210, a lens unit 220 and a second sensor 230.

The stereoscopic glasses 200 may have any shape to include the lens unit 220. Furthermore, a groove may be formed at the inside of the frame 210 and prepared for the lens unit 220.

The lens unit 220 is supported by the frame 210, and transmits light corresponding to the stereoscopic image displayed by the display apparatus 100, thereby providing a predetermined stereoscopic effect to a user.

The lens unit 220 allows the user to feel the predetermined stereoscopic effect. Thus, the lens unit 220 is provided in accordance with a method of displaying a stereoscopic image by the display apparatus 100.

If the display apparatus 100 according to an exemplary embodiment employs polarization glasses for displaying a stereoscopic image, the lens unit 220 includes a lens polarized in the same direction as polarized light corresponding to the stereoscopic image displayed by the display apparatus 100.

If the display apparatus 100 according to another exemplary embodiment employs shutter glasses for displaying a stereoscopic image, the lens unit 220 includes a left-eye lens unit and a right-eye lens unit so that the left-eye lens unit and the right-eye lens unit can be selectively opened and closed in sync with the stereoscopic image displayed by the display apparatus 100. That is, when the display apparatus 100 displays a stereoscopic image, the view of a user's left eye or right eye is selectively opened or closed in accordance with which one of a left eye image and a right eye image is displayed. If the display apparatus displays the left eye image, the lens unit opens the view of the left eye and closes the view of the right eye. On the other hand, if the display apparatus displays the right eye image, the lens unit opens the view of the right eye and closes the view of the left eye.

Thus, if the stereoscopic glasses 200 are achieved by the shutter glasses, the stereoscopic glasses 200 may include a communication unit (not shown) to receive a shutter control signal by communicating with the display apparatus, and a shutter controller (not shown) to selectively open and close the lens unit 220 on the basis of the shutter control signal.

The second sensor 230 can sense the user's viewing area within a 3D image displayed by the display unit 30. Specifically, the second sensor 230 may include at least one of an eye tracing sensor and an eye tracing camera capable of tracing at least one of a position and a motion of a pupil of the user's eyeball.

The second sensor 230 senses a position viewed by the user within a 3D image displayed by the display unit 30 by tracing at least one of the position and the motion of the user's eyeball, and thus generates information about the sensed viewing position, thereby transmitting the generated information to the display apparatus 100.

The second sensor 230 determines the user's viewing direction with respect to a preset point on the display unit 30 by sensing the position of the user's eyeball, and thus generates information about the viewing position by determining the position viewed by the user within a 3D image displayed by the display unit 30 on the basis of the determined viewing direction, thereby transmitting the generated information to the display apparatus 100.

Figure 4:
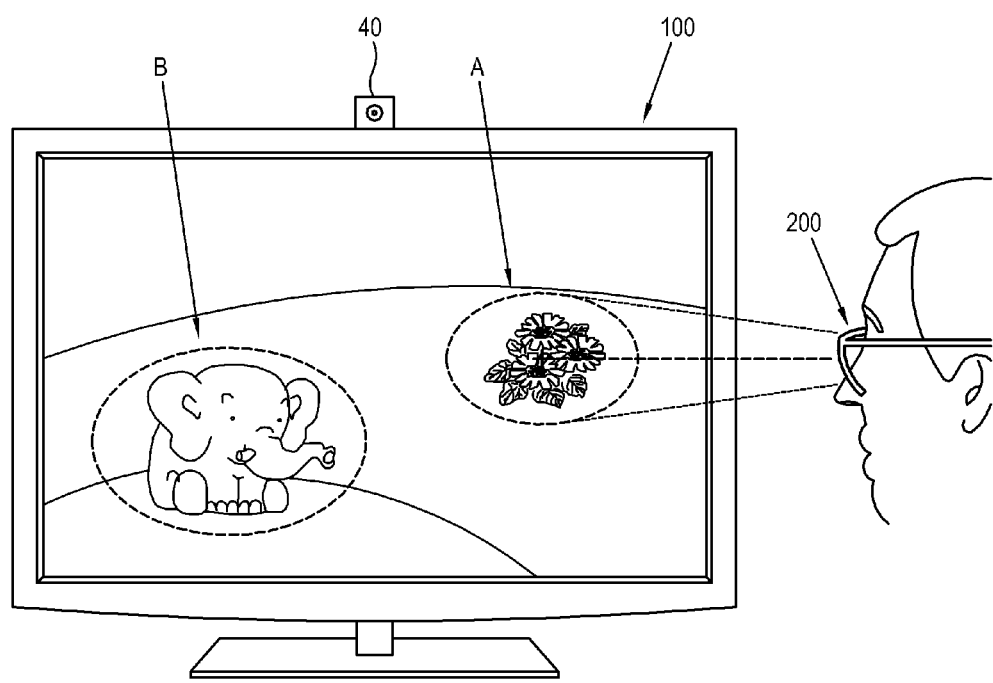
FIG. 4 shows an example of adjusting a depth effect through a signal processor 20 of a display apparatus 100 according to an exemplary embodiment.

FIG. 4 shows an example of adjusting depth through a signal processor 20 of a display apparatus 100 according to an exemplary embodiment.

The display apparatus 100 in the present exemplary embodiment includes the sensor 40. While the display apparatus 100 displays a 3D image, the sensor 40 senses at least one of a position and a motion of a user's eyeball to sense a position viewed by the user within a currently displayed image. The sensor 40 may perform the sensing in response to a certain key input by a user through a remote controller. Using the sensed position viewed by the user, the sensor 40 thereby generates information about the viewing position. The sensor 40 may sense at least one of the position and the motion of the user's eyeball at every vertical sync period.

On the basis of the generated information about the user's viewing position, a coordinate calculator 50 calculates coordinates corresponding to the viewing position on the display unit 30.

A viewing area scope determiner 60 may determine a scope where coordinates having values approximating to a predetermined range are most distributed among the calculated coordinates collected for a predetermined period of time and corresponding to the viewing position. Thus, the viewing area scope determiner 60 determines a predetermined scope within an image on the display unit 30, corresponding to the scope where coordinates having values approximating to a predetermined range are most distributed, as the user's viewing area scope.

Referring to FIG. 4, an object of an elephant is bigger than an object of flowers displayed by the display unit 30. However, a user's viewing area determined by the sensor 40, the coordinate calculator 50, and the scope determiner 60 is an area A including the object of the flowers, and not an area B including the object of the elephant. Thus, a controller 80 controls a signal processor 20 to process the area A to have a depth effect different in level from those of areas other than the area A.

According to an exemplary embodiment, the controller 80 may control the signal processor 20 to process an area A to have a depth effect having a predetermined level higher than those of the other areas except the area A. For example, if a 3D video signal including depth information is received through a receiver 10, a depth information extractor 21 extracts the depth information from the 3D video signal. Moreover, the controller 80 controls the signal processor 20 to process the area A to have a depth effect having a level higher than that of the extracted depth information, and the other areas except the area A to have a depth effect corresponding to the extracted depth information.

According to another exemplary embodiment, the controller 80 may control the signal processor 20 to process areas other than the area A to have a depth effect having a predetermined level lower than that of the area A. For example, if a 3D video signal including depth information is received through the receiver 10, the depth information extractor 21 extracts the depth information from the 3D video signal. Moreover, the controller 80 controls the signal processor 20 to process the area A to have a depth effect corresponding to the extracted depth information, and the other areas except the area A to have a depth effect having a level lower than that of the extracted depth information.

Figure 5:
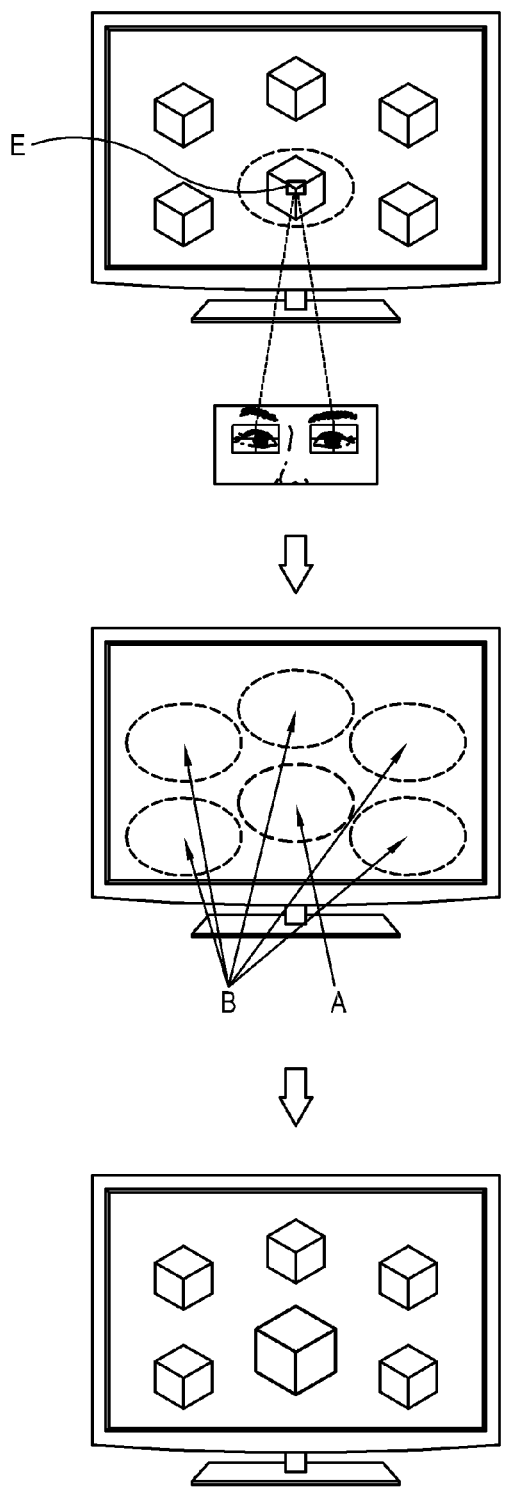
FIG. 5 shows an example of determining a viewing area in a display apparatus 100 according to an exemplary embodiment.

FIG. 5 shows an example of determining a viewing area in a display apparatus 100 according to an exemplary embodiment.

Referring to FIG. 5, the display apparatus 100 displays an image including a plurality of objects. When outputs of a sensor 40 and a coordinate calculator 50 are transmitted to a viewing area scope determiner 60, the viewing area scope determiner 60 determines a scope E where the coordinates having values approximating to a predetermined range are most distributed, on the basis of the received outputs. In particular, the viewing area scope determiner 60 may determine a certain object A corresponding to the scope E as a user's viewing area scope.

Accordingly, the controller 80 may control the signal processor 20 to process the object A to be different in a level of a depth effect as compared to other objects B. The different levels of the depth effect are the same as or similar to those described above with reference to FIG. 4, and thus repetitive descriptions thereof are omitted herein.

Figure 6:
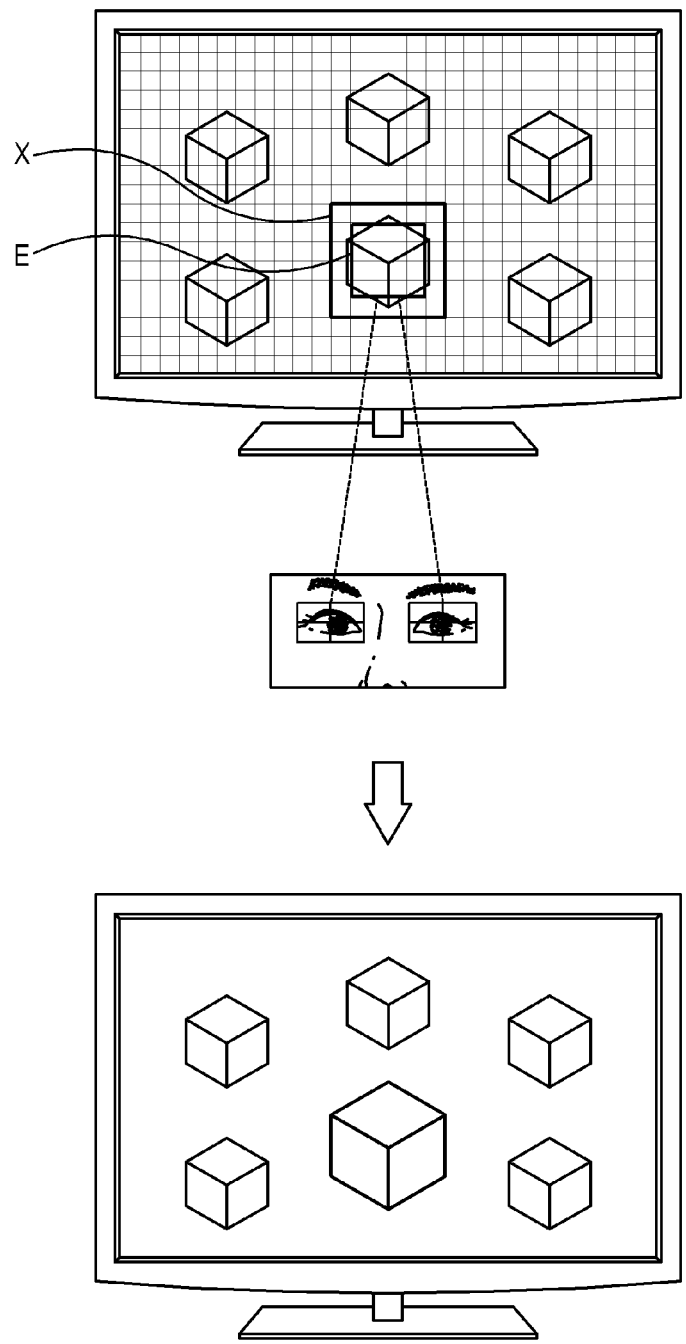
FIG. 6 shows an example of determining a viewing area in a display apparatus 100 according to another exemplary embodiment.

FIG. 6 shows an example of determining a viewing area in a display apparatus 100 according to another exemplary embodiment.

Referring to FIG. 6, an image displayed by the display apparatus 100 may be divided into a plurality of areas, i.e., N×M areas. When outputs of a sensor 40 and a coordinate calculator 50 are transmitted to a viewing area scope determiner 60, the viewing area scope determiner 60 determines a scope E where the coordinates having values approximating to a predetermined range are most distributed, on the basis of the received outputs.

For example, the viewing area scope determiner 60 may determine one or more areas X corresponding to the scope E among the plurality of N by M divisional areas as a user's viewing area scope.

Accordingly, the controller 80 may control a signal processor 20 to process the one or more areas X corresponding to the scope E to be different in level of a depth effect as compared to other areas. The different levels of the depth effect are the same as or similar to those described above with reference to FIG. 4, and thus repetitive descriptions thereof are omitted herein.

As described above, according to one or more exemplary embodiment, there are provided stereoscopic glasses and a display apparatus including the same in which an interest area where a user's view is determined to be fixed is processed to have a higher depth effect, and other areas are processed to have a depth effect lower than the depth effect of the interest area within a 3D image displayed by the display apparatus. Accordingly, the user's eyestrain can be remarkably reduced, thereby increasing convenience in 3D image viewing.

While not restricted thereto, an exemplary embodiment can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as computer programs transmitted over a computer-readable transmission medium, such as a carrier wave, and received and implemented in general-use or special-purpose digital computers that execute the programs. Moreover, in an exemplary embodiment, one or more units of the display apparatus 100 and the stereoscopic glasses 200 can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
   a signal processor which processes a three-dimensional (3D) video signal to have a predetermined depth effect;
   a display unit which displays a 3D image based on the processed video signal processed by the signal processor;
   a sensor which senses the first area viewed by the user within the 3D image displayed by the display unit, wherein the sensor determines a viewing direction of the user with respect to a preset point on the display unit by sensing a position of an eyeball of the user, and generates information about a viewing position by determining a position viewed by the user within the 3D image displayed by the display unit according to the determined viewing direction;
   a coordinate calculator which calculates one or more coordinates corresponding to the viewing position on the display unit according to the information about the viewing position;
   a viewing area scope determiner which determines a scope of a viewing area of the user within the 3D image displayed by the display unit according to the one or more calculated coordinates, wherein the viewing area scope determiner determines, as the first area, a scope where a viewing frequency of the user is highest among viewing positions sensed for a predetermined period of time; and
   a controller which controls the signal processor to process a first area determined to be viewed by a user and a second area that is not determined to be viewed by the user, of the 3D image displayed by the display unit, such that the first area is different in level of a depth effect than the second area.

2. The display apparatus according to claim 1, wherein the controller controls the signal processor to process the first area to have a depth effect that is a predetermined level higher than a depth effect of the second area.

3. The display apparatus according to claim 1, wherein the controller controls the signal processor to process the second area to have a depth effect that is a predetermined level lower than a depth effect of the first area.

4. The display apparatus according to claim 1, wherein the sensor senses a position viewed by the user within the 3D image displayed by the display unit by tracing at least one of a position and a motion of an eyeball of the user, and generates information about the sensed viewing position.

5. The display apparatus according to claim 1, wherein the viewing area scope determiner determines, as the scope of the viewing area of the user, an object where a viewing frequency of the user is highest from among at least one object included in the 3D image.

6. The display apparatus according to claim 1, wherein:
   the 3D image displayed by the display unit comprises a plurality of divisional areas; and
   the viewing area scope determiner determines, as the scope of the viewing area of the user, at least one area where a viewing frequency of the user is highest among the plurality of divisional areas.

7. The display apparatus according to claim 4, further comprising a coordinate calculator which calculates one or more coordinates corresponding to the viewing position on the display unit according to the information about the viewing position.

8. The display apparatus according to claim 7, further comprising a viewing area scope determiner which determines a scope of a viewing area of the user within the 3D image displayed by the display unit according to the one or more calculated coordinates.

9. The display apparatus according to claim 8, wherein the viewing area scope determiner determines, as the scope of the viewing area of the user, a predetermined scope where a viewing frequency of the user is highest among viewing positions sensed for a predetermined period of time.

10. The display apparatus according to claim 9, wherein the viewing area scope determiner determines, as the scope of the viewing area of the user, an object where a viewing frequency of the user is highest from among at least one object included in the 3D image.

11. The display apparatus according to claim 10, wherein:
    the 3D image displayed by the display unit comprises a plurality of divisional areas; and
    the viewing area scope determiner determines, as the scope of the viewing area of the user, at least one area where a viewing frequency of the user is highest among the plurality of divisional areas.

12. The display apparatus according to claim 1, further comprising a receiver which receives the 3D video signal,
    wherein the signal processor comprises a depth information extractor which extracts depth information from the received 3D video signal when the received 3D video signal comprises the depth information, and
    the controller controls the signal processor to process the second area to have a depth effect having a level lower than a depth effect for the second area based on the extracted depth information.

13. The display apparatus according to claim 1, further comprising a receiver which receives the 3D video signal,
    wherein the signal processor comprises a depth information extractor which extracts depth information from the received 3D video signal when the received 3D video signal comprises the depth information, and the controller controls the signal processor to process the first area to have a depth effect having a level higher than a depth effect for the first area based on the extracted depth information.

14. The display apparatus according to claim 1, further comprising
a receiver which receives a two-dimensional (2D) video signal; and
a storage unit which stores depth information for reconstructing the received 2D video signal received though the receiver into the 3D video signal,
wherein the signal processor processes the received 2D video signal to be reconstructed as the 3D video signal according to the depth information stored in the storage unit, and
the controller controls the signal processor to process the second area to have a depth effect having a level lower than a depth effect for the second area based on the stored depth information.

15. The display apparatus according to claim 1, further comprising
a receiver which receives a 2D video signal; and
a storage unit which stores depth information for reconstructing the received 2D video signal received though the receiver into the 3D video signal,
wherein the signal processor processes the received 2D video signal to be reconstructed as the 3D video signal according to the depth information stored in the storage unit, and
the controller controls the signal processor to process the first area to have a depth effect having a level higher than a depth effect for the first area based on the stored depth information.

16. A display system comprising a display apparatus and stereoscopic glasses,
the display apparatus comprising:
a signal processor which processes a three-dimensional (3D) video signal to have a predetermined depth effect;
a display unit which displays a 3D image based on the processed video signal processed by the signal processor;
a sensor which senses the first area viewed by the user within the 3D image displayed by the display unit, wherein the sensor determines a viewing direction of the user with respect to a preset point on the display unit by sensing a position of an eyeball of the user, and generates information about a viewing position by determining a position viewed by the user within the 3D image displayed by the display unit according to the determined viewing direction;
a coordinate calculator which calculates one or more coordinates corresponding to the viewing position on the display unit according to the information about the viewing position;
a viewing area scope determiner which determines a scope of a viewing area of the user within the 3D image displayed by the display unit according to the one or more calculated coordinates, wherein the viewing area scope determiner determines, as the first area, a scope where a viewing frequency of the user is highest among viewing positions sensed for a predetermined period of time; and
a controller which controls the signal processor to process a first area determined to be viewed by a user and a second area that is not determined to be viewed by the user, of the 3D image displayed by the display unit, such that the first area is different in level of a depth effect than the second area,
and the stereoscopic glasses comprising:
a lens unit which transmits light corresponding to the 3D image displayed by the display unit to provide a predetermined depth effect;
a frame which supports the lens unit; and
a sensor which senses the first area viewed by the user within the 3D image displayed by the display unit.

17. The display system according to claim 16, wherein the sensor senses a position viewed by the user within the 3D image displayed by the display unit by tracing at least one of a position and a motion of an eyeball of the user, generates information about the sensed viewing position, and transmits the generated information to the display unit.

18. The display system according to claim 16, wherein the sensor determines a viewing direction of the user with respect to a preset point on the display unit by sensing a position of an eyeball of the user, generates information about a viewing position by determining a position viewed by the user within the 3D image displayed by the display unit according to the determined viewing direction, and transmits the generated information to the display unit.

19. Stereoscopic glasses for viewing a three-dimensional (3D) image displayed by a display apparatus, the stereoscopic glasses comprising:
a lens unit which transmits light corresponding to the 3D image displayed by the display apparatus to provide a predetermined depth effect;
a frame which supports the lens unit; and
a sensor which senses a first area viewed by a user within the 3D image displayed by the display apparatus,
wherein the sensor determines a viewing direction of the user with respect to a preset point on the display apparatus by sensing a position of an eyeball of the user, generates information about a viewing position by determining a position viewed by the user within the 3D image displayed by the display apparatus according to the determined viewing direction, and transmits the generated information the display apparatus,
wherein the display apparatus calculates one or more coordinates corresponding to the viewing position on the 3D image according to the information about the viewing position, determines a scope where a viewing frequency of the user is highest among viewing positions sensed for a predetermined period of time as the first area according to the one or more calculated coordinates, and processes the first area determined to be viewed by a user and a second area that is not determined to be viewed by the user, such that the first area is different in level of a depth effect than the second area.

20. A method of processing a three-dimensional (3D) video signal, the method comprising:
displaying, by a display unit, a 3D image based on the 3D video signal;
sensing a first area viewed by a user within the 3D image displayed by the display unit;
determining a viewing direction of the user with respect to a preset point on the display unit by sensing a position of an eyeball of the user;
generating information about a viewing position by determining a position viewed by the user within the 3D image displayed by the display unit according to the determined viewing direction;

calculating one or more coordinates corresponding to the viewing position on the display unit according to the information about the viewing position;

determining a scope of a viewing area of the user within the 3D image displayed by the display unit according to the one or more calculated coordinates;

determining, as the first area, a scope where a viewing frequency of the user is highest among viewing positions sensed for a predetermined period of time; and processing the first area determined to be viewed by the user and a second area that is not determined to be viewed by the user, of the 3D image displayed by the display unit, such that the first area is different in level of a depth effect than the second area.

21. A non-transitory computer readable recording medium having recorded thereon a program executable by a computer for performing the method of claim 20.

\* \* \* \* \*